United States Patent [19]
Decore et al.

[11] Patent Number: 5,547,307
[45] Date of Patent: Aug. 20, 1996

[54] DEVICE FOR BUTT-JOINTING PERFORATED CABLE TRAY SECTIONS

[75] Inventors: Bertrand Decore, La Chapelle Saint Aubin; Alain Jadaud, Tennie, both of France

[73] Assignees: Legrand; Legrand SNC, both of Limoges, France

[21] Appl. No.: 354,801

[22] Filed: Dec. 12, 1994

[30] Foreign Application Priority Data

Dec. 10, 1993 [FR] France .................................. 93 14852

[51] Int. Cl.⁶ .................................. F16L 3/26; F16B 7/04
[52] U.S. Cl. ........................ 403/294; 403/292; 403/405.1; 248/68.1; 248/49

[58] Field of Search .............................. 248/61, 60, 68.1, 248/49; 403/294, 292, 405.1, 406.1, 407.1, 409.1

[56] References Cited

FOREIGN PATENT DOCUMENTS

| 1540323 | 4/1971 | Germany . |
|---|---|---|
| 1359150 | 7/1974 | United Kingdom . |

Primary Examiner—Anthony Knight
Attorney, Agent, or Firm—Young & Thompson

[57] ABSTRACT

A device for butt-joining two sections of perforated cable tray includes a fishplate having on each side of a central area a latch member adapted to slide in a longitudinal slot with hoops adapted to cooperate with a line of perforations and to be locked therein by means of a comb member.

21 Claims, 4 Drawing Sheets

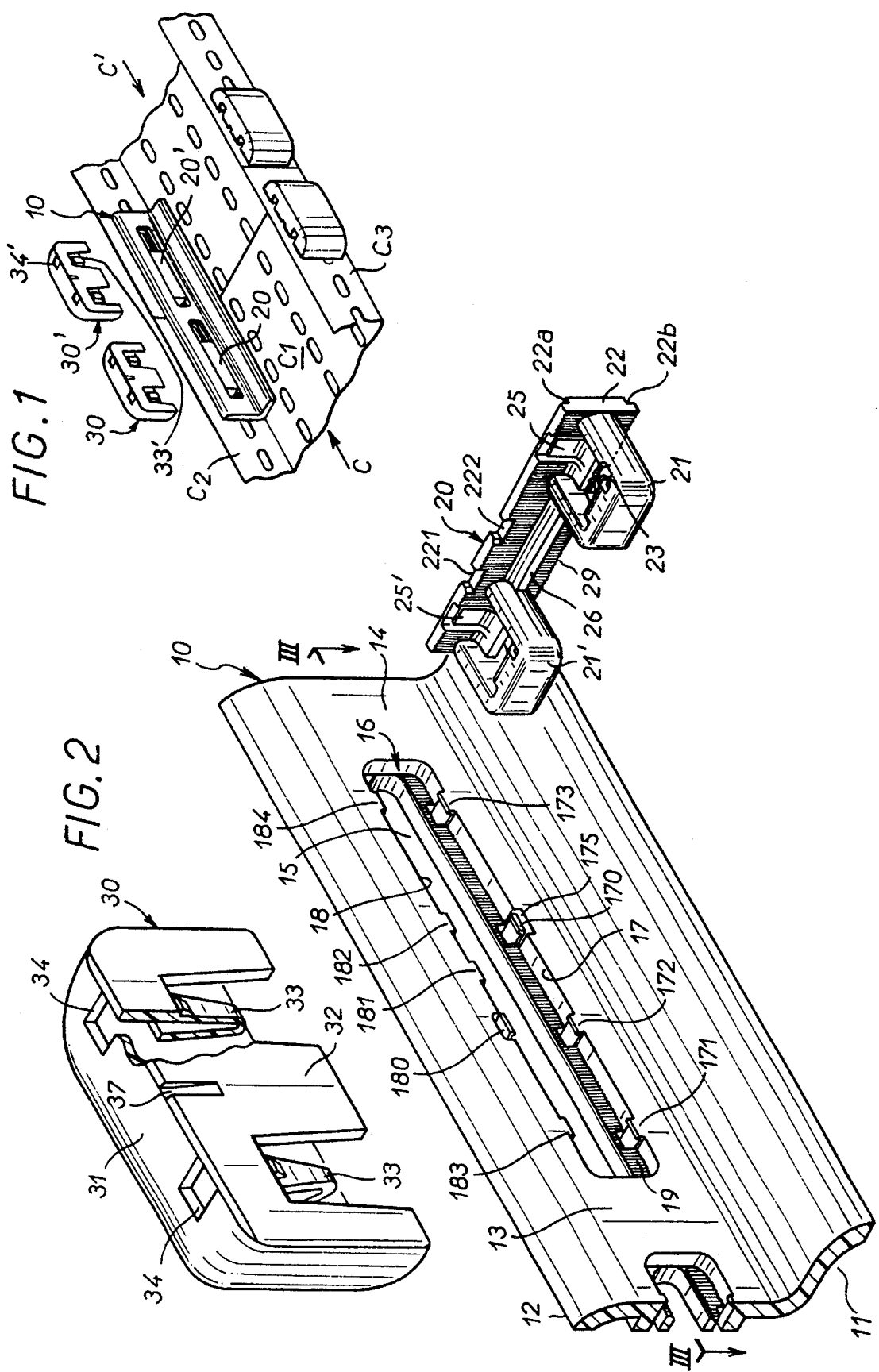

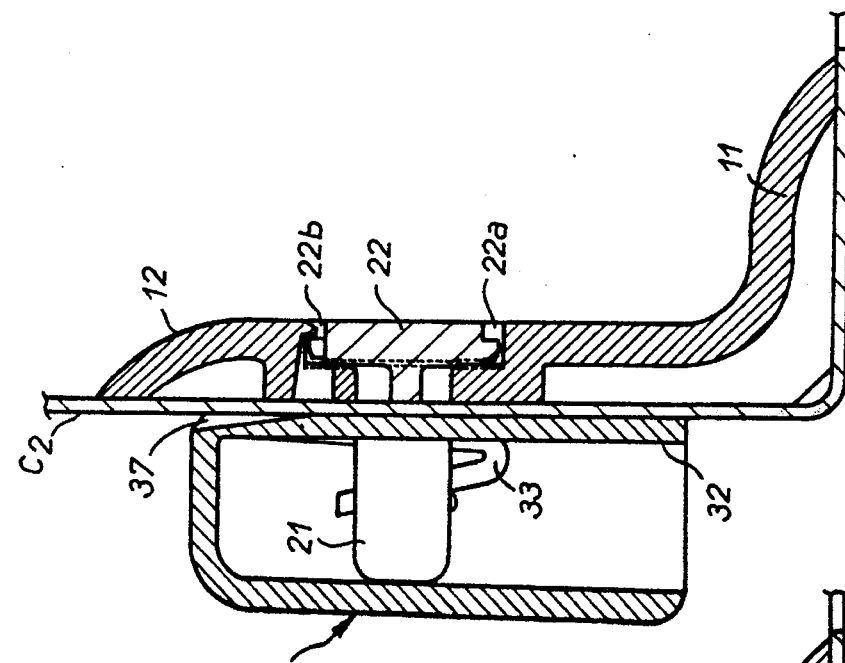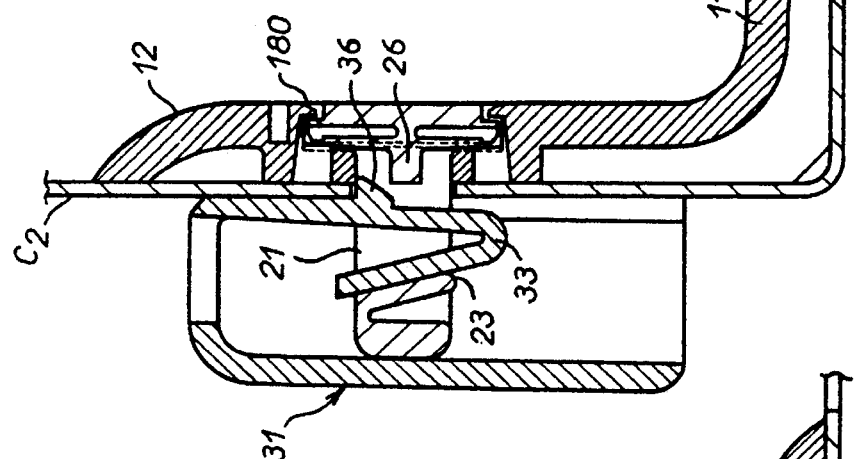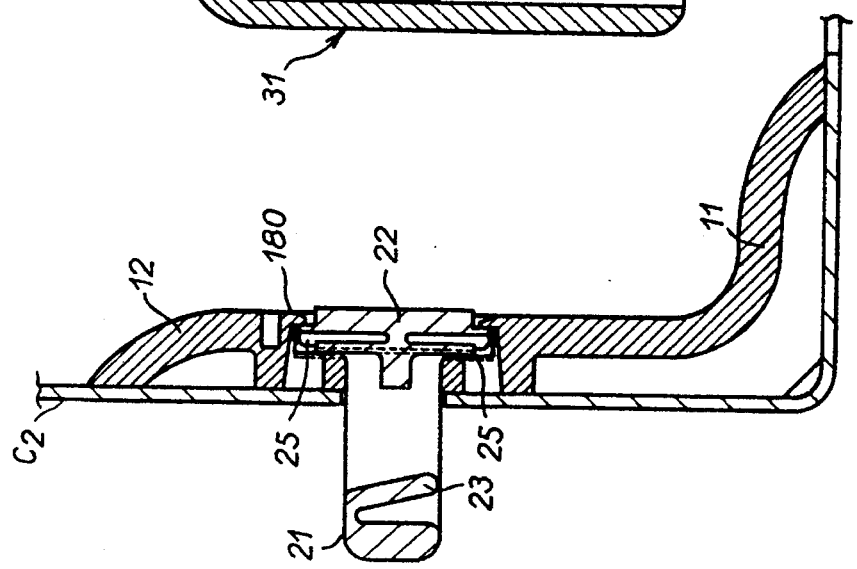

DEVICE FOR BUTT-JOINTING PERFORATED CABLE TRAY SECTIONS

BACKGROUND OF THE INVENTION

1. Field of the Invention

The present invention concerns cable trays constructed by butt-jointing channel-section tray sections which have regularly spaced perforations in the bottom and side walls.

2. Description of the Prior Art

These cable tray sections are always supplied in predetermined unit lengths, regardless of the material from which they are made (metal, plastics, composite, . . . ) and the method of manufacture (bending and/or stamping, molding, extrusion, pultrusion, . . . ). The sections are usually butt-jointed by means of fishplates which have, facing a row of perforations, a row of hoops adapted to engage in at least two perforations of each of the two sections to be jointed and a locking comb member whose teeth are wedged in the hoops engaged in the perforations.

Installing a cable tray involves cutting sections to varying lengths, with the result that the position of the end of the section relative to the perforations is usually modified.

Consequently, to re-establish the pitch of the perforations with a conventional fishplate and comb, it is necessary to leave a gap between adjacent sections, which has the disadvantage of interrupting the desirable continuity of the cable tray.

An object of the invention is to avoid this drawback by eliminating the necessity to re-establish the pitch of the perforations.

SUMMARY OF THE INVENTION

To this end the invention proposes a connecting device of the type mentioned above using fishplates with hoops and locking comb, essentially characterized by the provision in the fishplate of means for adjusting the position of the hoops.

This arrangement compensates for the discontinuity in the pitch of the perforations regardless of the position of the adjacent end of the section.

The adjustment means can advantageously include a fishplate having on either side of a central area a continuous slot facing a row of perforations and a latch member associated with each slot having at least two projecting hoops and adapted to slide in the slot.

By virtue of this arrangement the butt-jointing without gaps of two cable tray sections is made possible by the facility for moving each latch member in its slot in such a way that the hoops face the corresponding perforations, regardless of the position of the adjacent end of the section relative to the columns of perforations.

In one advantageous embodiment of the invention particularly suited to molding of the component parts of the device the slots on either side of the middle of the fishplate constitute an elongate window at the bottom of an embrasure formed in the thickness of the upstanding portion of an L-shape cross-section fishplate.

A faceplate of each latch member being adapted to nest in the embrasure of a corresponding window, the result is a particularly compact and effective assembly.

In accordance with a further advantageous feature of the invention complementary rough areas are provided on the bottom of the embrasure and on the inside surface of the plate of the latch member, this having the advantage, after inserting the locking comb member, of fixing the translational adjustment of the latch members and making the assembly more secure.

The locking comb members used in the device of the invention have a cap, which has many advantages. Firstly, it protects against the risk of unlocking by unintentional detachment or tearing off of the comb member. It also increases the ruggedness of the device and improves the appearance of the cable tray.

An important advantage of the device of the invention is that it can be fitted without tools.

The features and advantages of the invention will emerge from the following description given by way of example with reference to the appended drawings.

BRIEF DESCRIPTION OF THE DRAWINGS

FIG. 1 is a perspective view of two sections of cable tray positioned end-to-end to be fastened together in accordance with the invention.

FIG. 2 is a view to a larger scale showing a fishplate, a latch member and a comb member.

FIG. 4 is a view in transverse section on the line IV—IV in FIG. 3 before the comb member is fitted.

FIG. 5 is a similar view after the comb member has been fitted.

FIG. 6 is a view in section on the line VI—VI in FIG. 3.

DETAILED DESCRIPTION OF THE PREFERRED EMBODIMENTS

Figure 3:
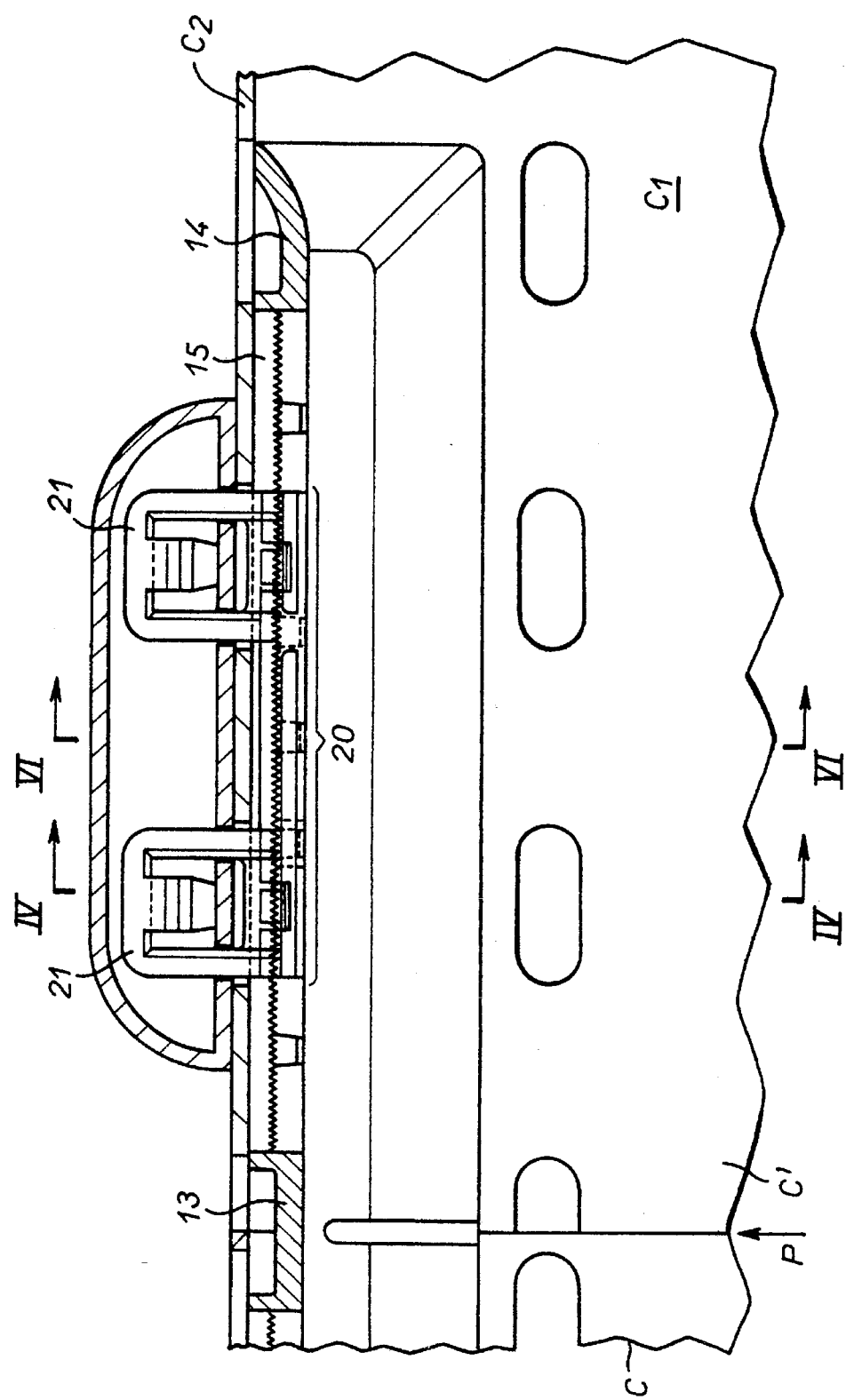
FIG. 3 is a plan view of an assembled device in section on the Line III—III in FIG. 2.

In the embodiment of the invention described and shown (FIG. 1) two sections C and C' of cable tray are joined together end-to-end by two devices of the invention each comprising a fishplate 10, two latch members 20 and two comb members 30. Each cable tray conventionally comprises a channel-section with a bottom wall C1 between two side walls C2 and C3, each wall having aligned perforations, in three rows on the bottom wall C1 and in a single row on each of the side walls C2 and C3.

Referring to FIG. 1, the position of the perforations relative to the mating plane between two end-to-end sections C and C' is random because the sections have to be cut to length: in this example the cut at the end of the section C' runs through a column of perforations although normally the end of a section is at the middle of the gap between two columns of perforations, like that of the section C.

In this example the cable tray is extruded from plastics material with elongate perforations 25 mm long at a pitch of 50 mm.

The fishplate 10 has an L-shape cross-section adapted to nest in the corner between the bottom wall C1 and one side wall C2 or C3 of the cable tray. It has a bottom flange 11 and a side flange 12. The latter has, between a central area 13 and each of the two end areas 14, a window 15 facing the line of perforations on the side wall C2 or C3 of the cable tray. The length of each window is approximately 2.5 times the pitch of the perforations. Its height is substantially equal to the transverse dimension of the perforations.

To the rear of each window 15 is an embrasure 16 having retaining and guiding teeth projecting from its lower and upper lips 17, 18: along the lower lip 17 there are three rigid teeth 171, 172, 173 and a flexible tooth 170 forming a flexible hook in that it is at the end of an elastic tongue overlying a notch 175. Along the upper lip 18 there are, alongside a flexible tooth 180 forming a flexible hook, a closely spaced pair of teeth 181, 182 and two side teeth 183, 184 respectively aligned with the bottom teeth 171, 173.

The bottom wall of the embrasure 16 has serrations 19 extending to either side of the window 15 to the full length of the latter.

The latch member 20 of the invention has two hoops 21, 21' adapted to nest in two adjacent perforations of a line of perforations in the cable tray. The hoops have two parallel branches projecting from the plate 22 and a crossmember carrying an inclined blade member 23 on its inside surface.

The plate 22 adapted to be placed in the embrasure 16 has a thickness corresponding to the depth of the embrasure with rebates 22a, 22b formed in the upper and lower edges to enable sliding on the upper and lower guide teeth.

The plate 22 of the latch also has on one edge two notches (221 and 222 in FIG. 2) with at least one other similar notch in its opposite edge, offset from the former two notches.

To be more precise, as shown in FIG. 2, the notch 221 faces the inside branch of the hoop 21' and a similar notch is formed in the opposite edge facing the inside branch of the hoop 21.

The inside surface of the plate 22 carries serrations 29 complementary to the serrations 19 of the embrasure of the fishplate. This surface of the plate includes, facing each hoop 21, 21', a flexible blade 25, 25' in a corresponding opening on either side of a central rib 26 extending the full length of the latch member.

The third component of the device is the comb member 30 which has a pair of teeth 33, 33' between a cap 31 and a dorsal wall 32. Each of these teeth has, facing an opening 34, 34' and a wide recess in the dorsal wall, a downwardly extending part aligned with said dorsal wall and an upwardly extending part at an acute angle to the downwardly extending part and diverging therefrom. A pawl 36 adapted to cooperate with the perforation projects outwardly of the comb member at the root of the downwardly extending part of the tooth.

A wedge-shape notch 37 is provided in the middle of the upper edge of the dorsal surface of the comb member for inserting a tool (screwdriver or the like) for demounting the comb member, if necessary.

How the device thus constituted works is described next.

As already mentioned with reference to FIG. 1, two sections C and C' of cable tray are usually joined together using a connecting device on each side of the cable tray under construction.

In the device as supplied to the user, the two latch members are advantageously premounted on each fishplate by inserting a latch member into each of the two windows of the fishplate. This is effected by offering up the latch member 20 (FIG. 2) facing the embrasure 16 of the window 15 so that the two notches 221, 222 in its upper edge respectively face the teeth 181, 182 on the upper edge of the embrasure and the notch (not visible) in the lower edge of the plate 22 of the latch member faces the tooth 172 on the lower edge of the embrasure. The latch member is thus nested in a predefined position involving elastic deformation of the two flexible hooks 170 and 180, and the two hoops 21, 21' project from the dorsal side of the flange 12 of the fishplate, as shown in FIG. 4. The latch member can then slide freely in the window 15, the elastic blades 25 sliding with slight friction on the serrations 19 on the rear wall of the embrasure. The abutment teeth 171–173 and 181–184 guide the plate 22 whose outside surface projects slightly from the inside surface of the upstanding part of the fishplate; this is the position shown in FIG. 4.

To fit the fishplate equipped in this way with a latch member on either side of the central area 13 (FIG. 3), the central area 13 is disposed across the mating plane P between the two sections C and C' of cable tray and each of the two latch members 20 is moved in its respective window 15 until its two hoops 21, 21' are facing two adjacent perforations. When this position has been found for each of the two latch members, the fishplate is pushed into contact with the aligned side walls C2 so that each of the hoops 21, 21' is inserted into a corresponding perforation; this position is shown in FIG. 4.

All that is then required is to insert a comb member 30 into the two hoops 21, 21' of each latch member. The insertion of the comb member into the hoops is facilitated by the tapered shape of the tooth 33 in both the longitudinal and transverse directions. This insertion is also facilitated by the double bevel effect due to the inclination of the blade member 23 of the latch member and the inclination of the upwardly extending part of the tooth 33. This yields the locking position shown in FIGS. 5 and 6; by forcible engagement of the comb member tooth 33 on the inclined blade 23 of the hoop, downward movement of the comb causes elastic deformation of the blade member 23 and of the tooth 33 which presses the plate 22 of the latch member against the bottom of the embrasure with mutual interengagement of the complementary teeth 19 and 29: this simultaneously locks the fishplate and immobilizes the latch member against movement in translation so that the assembly formed thereby with the two sections C and C' of cable tray is made perfectly secure; this situation is that shown in FIGS. 5 and 6.

Note that the elasticity of the cooperating assembly means (flexible blade 23 and/or tooth 33) enables the device to accommodate any variations in the thickness of the wall C2, whether due to the manufacturing process or due to the configuration of the sections.

To demount the device, if necessary, all that is required is to insert a tool such as a screwdriver or the like into the notch 37 in the dorsal surface of the comb member to apply leverage against the side wall C2 of the cable tray in order to release the pawl 36 from under the rib 26 on the latch member, against the return force due to elastic deformation of the blades 23 and of the upwardly extending branch of the teeth 33. After removing the comb member when released in this way, the situation is as shown in FIG. 4 and the fishplate with the two latch members can be demounted without difficulty.

The invention is naturally not limited to the details of the embodiment of the invention just described by way of illustrative example. For example, one feasible simplification is to eliminate the blades 25, 25' of the latch member whose function is limited to improving guiding of the latch member during movement to find the correct position by holding the serrations 19 and 29 apart pending their interengagement and locking by the comb member. Another feasible simplification is to dispense with the two-fold spring action resulting from the cooperation of each blade 23 of a hoop with a tooth 33 of the type concerned: for example, the elastic blade 23 can be dispensed with to rely on the elasticity of the tooth 33 only, or conversely a rigid comb member tooth could cooperate with an elastic blade 23.

Figure 7:
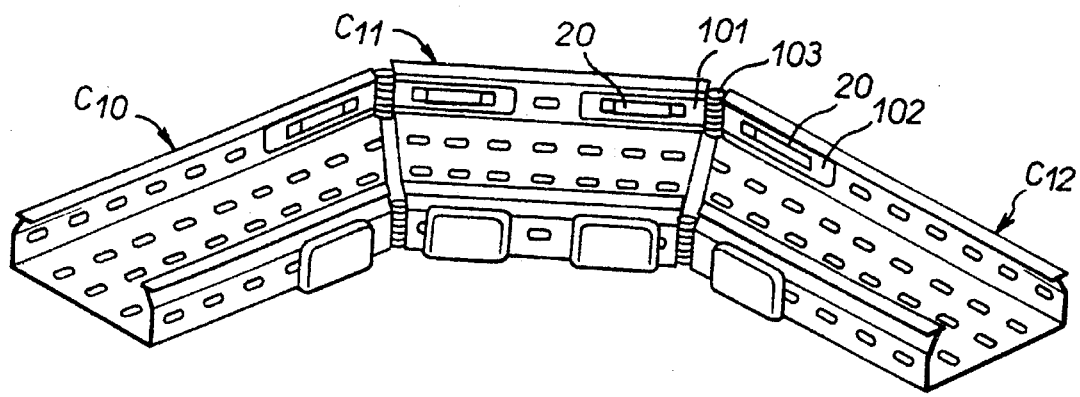
FIGS. 7 through 9 are diagrammatic perspective views of articulated embodiments of the device, respectively for changing direction, bifurcation and changing plane.
Figure 8:
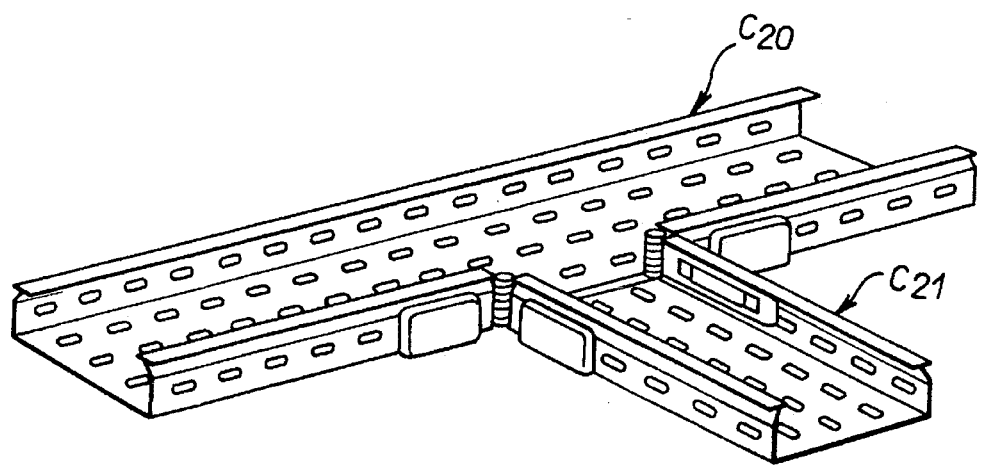
Figure 9:
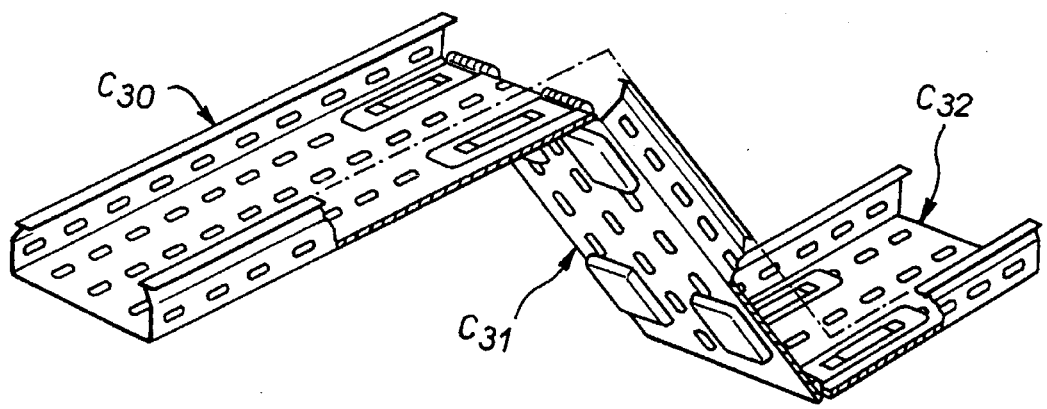

FIGS. 7 through 9 show other embodiments of the invention which have in common articulation of the fishplate in its central area.

In FIG. 7 two sections C10 and C12 of cable tray at right angles to each other are linked by an intermediate section C11, the adjacent ends being cut at 22.5° at each of the butt-joints. Straddling each joint and on each of the two sides of the structure is a connecting device comprising two half-fishplates 101, 102 on opposite sides of a hinge 103, each with a latch member 20 adapted to cooperate as previously with a line of perforations and to be locked in place by a comb member 30.

In FIG. 8 a bifurcation C21 is provided on a cable tray section C20 by cutting an opening into one side wall of the latter. Once again there is on each of the two sides of the bifurcation a hinge device similar in all respects to the device shown in FIG. 7.

FIG. 9 shows similar devices fitted to the bottom wall of sections C30, C31, C32 which bring about a change of level in the vertical direction by butt-jointing of a section C31 inclined at 45° (for example) between two horizontal sections C30, C32.

In all these examples the fishplates can advantageously have a generally flat profile rather than the L-shape cross-section of the embodiments previously described.

It is not essential for there to be two hoops on each latch member or for the hoops to be aligned: there is nothing to prevent connecting devices of the invention co-operating with two or more lines of perforations and to this end comprising latch members carrying a multiple plurality of hoops with corresponding alignments on a common plate.

There is claimed:

1. Butt-jointing device for butt-jointing sections of cable trays having aligned perforations, said device comprising (i) a fishplate having slot means registrable with aligned perforations in adjacent sections to be butt-jointed, (ii) latch means having at least one projecting hoop insertable through the slot means and registrable aligned perforations of each of the adjacent sections, the latch means being adjustable in position along the slot means, and (iii) comb means having teeth nestingly insertable into the projecting hoops for securing the butt-jointing device in position on the adjacent sections.

2. Butt-jointing device according to claim 1, wherein said latch means comprises at least two latch members, one for each of the adjacent sections, and wherein the comb means comprises at least two comb members, each of the comb members being nestingly securable to the projecting hoops of the respective latch members.

3. Butt-jointing device according to claim 2, wherein said slot means comprises a slot located to each side of a central area of the fishplate.

4. Butt-jointing device according to claim 3, wherein said fishplate includes a side flange, said slot means extending through the thickness of the side flange, said slot means comprising a slot located to each side of a central area of the side flange of the fishplate including an elongate recess facing forwardly and defining an embrasure, and an elongate window located rearwardly of the embrasure and in communication with the same.

5. Butt-jointing device according to claim 4, wherein each of said latch members includes a face plate nestable in said embrasure and slidable therein, the projecting hoops protruding rearwardly beyond the windows.

6. Butt-jointing device according to claim 4, wherein said embrasure comprises a rear wall, serrations being defined on said rear wall and facing forwardly.

7. Butt-jointing device according to claim 6, wherein retaining and guiding teeth are defined along an upper and a lower edge of said embrasure.

8. Butt-jointing device according to claim 7, further comprising a flexible hook disposed in a central portion of the upper and lower edges of said embrasure.

9. Butt-jointing device according to claim 7, wherein rebates are formed on upper and lower edges of said latch members for cooperation with said retaining and guiding teeth.

10. Butt-jointing device according to claim 6, wherein said latch means includes a face plate comprising complementary serrations defined on a rearward surface of said face plate of positively locking the butting-jointing device in position.

11. Butt-jointing device according to claim 10, wherein said face plate also has guide blades facing the at least one hoop thereon.

12. Butt-jointing device according to claim 2, wherein each of said comb members includes a cap for receiving the respective at least one projecting hoop.

13. Butt-jointing device according to claim 2, wherein each of said comb members has a number of teeth corresponding to the number of hoops on a respective one of said latch members.

14. Butt-jointing device according to claim 2, further comprising comb locking means operative in response to full engagement of said serrations of said members in said hoops.

15. Butt-jointing device according to claim 14, wherein said comb locking means includes a pawl cooperable with an edge of said perforations in said fishplate.

16. Butt-jointing device according to claim 15, wherein each of said comb members has a wedge-shaped notch in a dorsal wall thereof.

17. Butt-jointing device according to claim 1, further comprising complementary serrations on said latch means and said fishplate for positively locking the butt-jointing device in position.

18. Butt-jointing device according to claim 1, wherein said fishplate has an L-shape cross-section.

19. Butt-jointing device according to claim 18, wherein said fishplate has a generally flat cross-section.

20. Butt-jointing device according to claim 1, further comprising articulation means in a central area of said fishplate.

21. Butt-jointing device for butt-jointing sections of cable trays having aligned perforations, said device comprising a fishplate having a slot located to each side of a central area of the fishplate, said slots being registrable with aligned perforations in adjacent sections to be butt-jointed, two latch members, one for each of the adjacent sections, the latch members each having two projecting hoops insertable through the respective slots and registrable aligned perforations of the adjacent sections, the latch members being adjustable in position along their respective slots, and two comb members having teeth nestingly insertable into the projecting hoops for securing the butt-jointing device in position on the adjacent sections.

\* \* \* \* \*